US006727813B2

(12) United States Patent
Iwasaki et al.

(10) Patent No.: US 6,727,813 B2
(45) Date of Patent: Apr. 27, 2004

(54) ALARM NOTIFYING DEVICE AND COMPUTER PROGRAM

(75) Inventors: Yasuhiko Iwasaki, Sakura (JP); Ichiro Takahashi, Inzai (JP); Seigo Kurokawa, Funabashi (JP); Kiyohiro Nakano, Funabashi (JP); Manabu Fujimoto, Narashino (JP); Kouji Kakuta, Narashino (JP); Hiromitsu Kaneko, Funabashi (JP)

(73) Assignees: Hitachi, Ltd., Tokyo (JP); Hitachi Techno Engineering Co., Ltd., Tokyo (JP); Hitchi Keiyo Engineering & Systems, Ltd., Chiba (JP)

( * ) Notice: Subject to any disclaimer, the term of this patent is extended or adjusted under 35 U.S.C. 154(b) by 190 days.

(21) Appl. No.: 09/942,613

(22) Filed: Aug. 31, 2001

(65) Prior Publication Data

US 2002/0158758 A1 Oct. 31, 2002

(30) Foreign Application Priority Data

Apr. 26, 2001 (JP) ....................................... 2001-129084

(51) Int. Cl.[7] ............................ H04Q 1/30; G08B 1/08

(52) U.S. Cl. ..................... 340/531; 340/3.54; 340/7.29; 340/539.17; 379/37; 379/93.24

(58) Field of Search ................................ 340/531, 539, 340/500, 501, 502, 3.1, 3.54, 7.29, 539.17, 539.18; 700/17, 83; 379/37–41, 93.24

(56) References Cited

U.S. PATENT DOCUMENTS

| | | | | | |
|---|---|---|---|---|---|
| 5,917,405 | A | * | 6/1999 | Joao | 340/426 |
| 6,023,223 | A | * | 2/2000 | Baxter, Jr. | 340/539 |
| 6,151,385 | A | * | 11/2000 | Reich et al. | 379/49 |
| 6,211,782 | B1 | * | 4/2001 | Sandelman et al. | 340/506 |
| 6,529,133 | B2 | * | 3/2003 | Tamaoki et al. | 340/539 |

* cited by examiner

*Primary Examiner*—Donnie L. Crosland
(74) *Attorney, Agent, or Firm*—Antonelli, Terry, Stout & Kraus, LLP

(57) ABSTRACT

An alarm notifying device comprises a circuit which performs communications via a communication line, a circuit which detects a signal indicative of an operating condition of a facility to be monitored, and an alarm signal sent therefrom, and a CPU. The alarm notifying device notifies an alarm to the outside when the alarm signal is detected. The alarm notifying device has the function of receiving a mail, the function of analyzing the contents of a text of the received mail, and the function of changing information lying inside the device according to the contents of the text of the received mail.

13 Claims, 4 Drawing Sheets

FIG. 3

(a)

| DESTINATION ALARM NOTIFYING DEVICE NO. | TELEPHONE NUMBER | ID | PASSWORD | COMMAND | ATTACHED FILE | MAIL ADDRESS |
|---|---|---|---|---|---|---|
| V-CATW01 | XXX-XXX-XX12 | TAKAHASHI | ****** | STAT | – | takahashi@ x x x .co.jp<br>iwasaki@ x x x .co.jp |
| V-CATW02 | * | KUROKAWA | ****** | GET | – | kurokawa@ x x x .co.jp |
| V-CATW03 | * | NAKANO | ****** | PUT | – | nakano@ x x x .co.jp |
| V-CATW04 | XXX-XXX-XX18 | FUJIMOTO | ****** | GET | – | fujimoto@ x x x .co.jp |
| V-CATW05 | XXX-XXX-XX14 | IWASAKI | ****** | STAT<br>SET | ABC.DAT | iwasaki@ x x x .co.jp |
| V-CATW06 | XXX-XXX-XX43 | KAKUTA | ****** | PUT | – | kakuta@ x x x .co.jp |
| • | • | • | • | • | • | • |
| • | • | • | • | • | • | • |

(b)

DESTINATION : V-CATW01

SUBJECT : V-CATW-CONFIGU

TEXT :
ID=TAKAHAHI
PASSWORD=******
COMMAND=PUT, WY10=1 ← PERFORM OUTPUT TO FACILITY
COMMAND=GET ← GET OPERATING CONDITION OF FACILITY
COMMAND=STAT ← RETURN PRESENT ACQUIRED CONDITION
COMMAND=SET,PATH=/usr/bin ← COPY ATTACHED FILE TO FOLDER DESIGNATED BY PATH RETADDRESS=TO,takahashi@ x x x .co.jp
RETADDRESS=TO,iwasaki@ x x x .co.jp
RETADDRESS=CC,kurokawa@ x x x .co.jp
} RETURN ADDRESS

FIG. 4

| FACILITY NO. | FACILITY NAME | MAKER | TYPE | SIGNAL NO. | SIGNAL NAME | SET DATE | RENEWAL DUE DATE |
|---|---|---|---|---|---|---|---|
| | | | | | | DATE | DATE |
| 1 | NO. 1 PUMP | H CO., LTD | HP-1 | 1 | PUMP FAILURE | 00. 09.14 | 15. 09.14 |
| | | | | 2 | START TIE-UP | | |
| | | | | 3 | REDUCTION IN DELIVERY PRESSURE | | |
| | | | | 4 | ELB TRIP | | |

ALARM NOTIFYING DEVICE AND COMPUTER PROGRAM

BACKGROUND OF THE INVENTION

1. Field of the Invention

The present invention relates to a system for managing facilities such as a water supply/delivery system for water supply and drainage, an industrial manufacturing facility, a sales data collecting facility, etc.

2. Description of the Related Art

An alarm notifying device for controlling, monitoring and notifying operating conditions or the like of facilities such as water supply and drainage has been installed. In the conventional alarm notifying device, when failures or the like occur in a facility, a message has been sent to its corresponding destination pre-set within the alarm notifying device by use of voice, FAX, a mail or the like. In order to change the destination, however, the alarm notifying device needs to directly change data about the destination set within the alarm notifying device. An alarm notifying device installed in a remote place has encountered difficulties in coping with it.

SUMMARY OF THE INVENTION

The present invention has been made to solve the conventional problems. Therefore, the present invention aims to provide an alarm notifying device having the function of receiving the operation of an alarm or warning message lying within a monitor by mail to thereby change it remotely, and a computer program used therefor.

The present invention provides an alarm notifying device which comprises a circuit which performs communications through a communication line, a circuit which detects a signal indicative of an operating condition of a facility to be monitored, and an alarm signal sent therefrom, and a CPU, and notifies an alarm to the outside when the alarm signal is detected, and which includes the function of receiving a mail, the function of analyzing the contents of a text of the received mail, and the function of changing information lying inside the alarm notifying device according to the contents of the text of the received mail.

BRIEF DESCRIPTION OF THE DRAWINGS

FIG. 3 is a diagram for describing one example of a mail employed in the embodiment; and FIG. 4 is a diagram for describing one example of internal information lying in the alarm notifying device according to the embodiment.

DETAILED DESCRIPTION OF THE INVENTION

A preferred embodiment of the present invention will be described.

Figure 1:
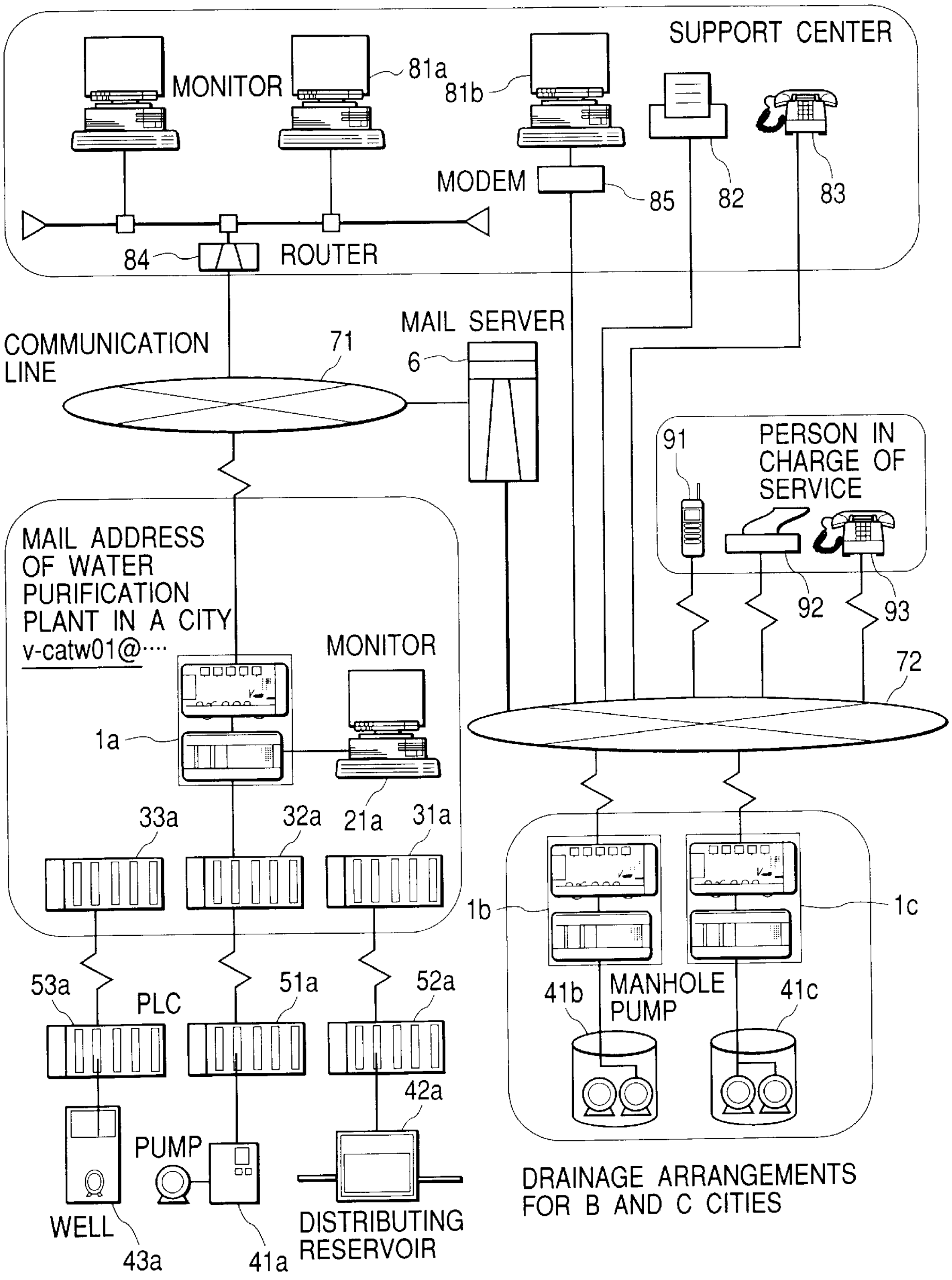
FIG. 1 is a diagram f or describing an alarm notifying device according to an embodiment.
Figure 2:
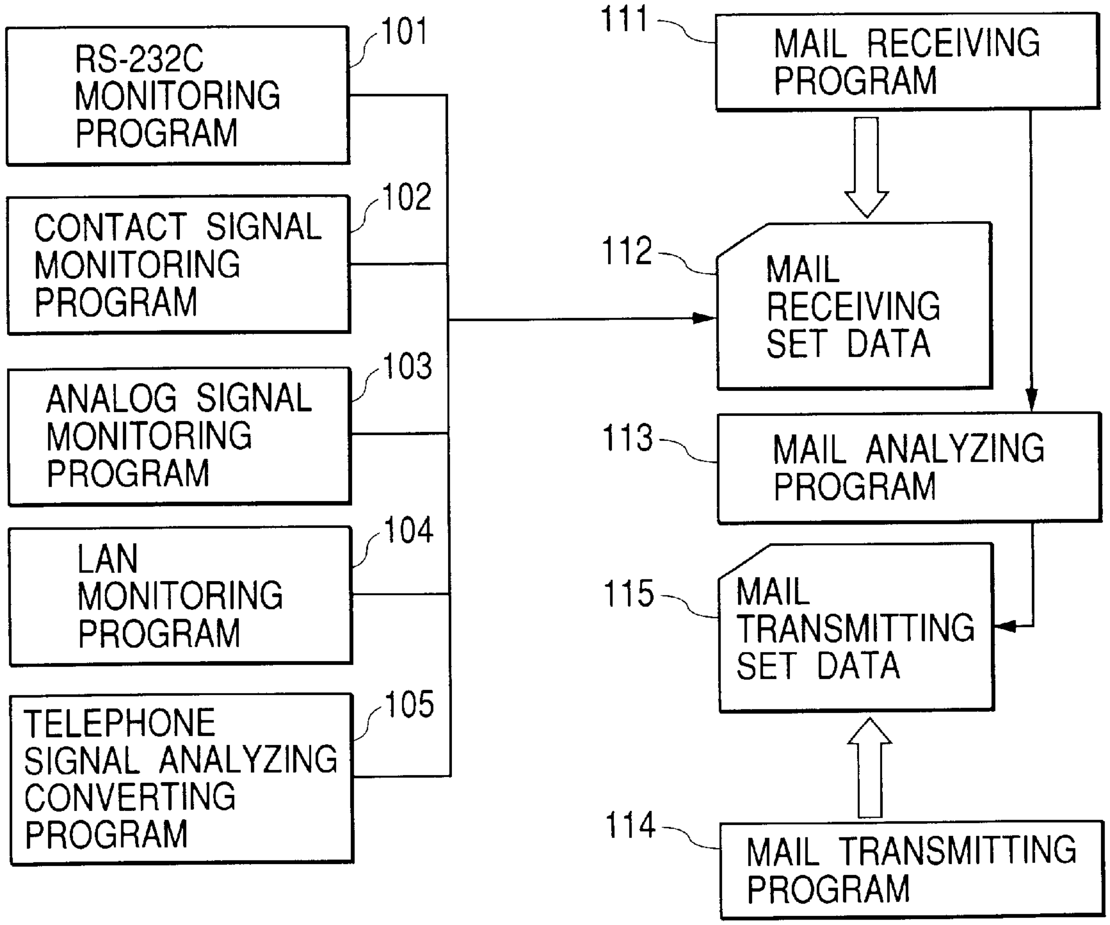
FIG. 2 is a diagram for describing a program construction of a mail delivery control system employed in the alarm notifying device according to the embodiment.

An embodiment illustrative of an alarm notifying device of the present invention will be described with reference to FIGS. 1 through 3. FIG. 1 is a diagram for describing the alarm notifying device according to the embodiment. FIG. 2 is a diagram for describing a program construction of a mail delivery control system employed in the alarm notifying device according to the embodiment. FIG. 3 is a diagram for describing one example of a mail employed in the embodiment. FIG. 4 is a diagram for describing one example of internal information lying in the alarm notifying device according to the embodiment.

The embodiment will be explained. The alarm notifying device according to the present embodiment is provided with a circuit which communicates via a communication line, a circuit which detects a signal indicative of an operating condition of a facility to be monitored, and an alarm signal sent therefrom, and a CPU, and has the function of notifying an alarm to the outside when the alarm signal is detected, and receiving a mail, the function of analyzing the contents of a text of the received mail, and the function of changing information lying inside the alarm notifying device according to the contents of the text of the received mail. Further, the alarm notifying device according to the present embodiment has the function of reading an ID and a password from the received mail and determining whether the read ID and password coincide with the corresponding one of combinations of IDs and passwords preset to the alarm notifying device by comparison. Furthermore, the alarm notifying device according to the present embodiment has the function of transmitting information lying inside the alarm notifying device via the communication line, the function of transmitting a reply to a received mail to a mail sender, the function of receiving a mail from a telephone line, the function of determining whether a mail is regularly received, the function of receiving a mail from a circuit for receiving a signal byway of a LAN, the function of receiving a mail from a circuit for receiving a signal by way of RS-232C, the function of receiving a mail from a contact signal circuit, the function of receiving a mail from an analog signal circuit, the function of by-mail transmitting a reply to the received mail to its corresponding pre-registered destination to be transmitted, and the function of changing a mail's destination by means of buttons of a telephone or telephone set.

The alarm notifying device la according to the present embodiment is installed in a water purification plant in an A city as shown in FIG. 1 and monitors operating conditions of a pump 41*a,* a distributing reservoir 42*a*, a well 43*a,* etc., a water level, a flow rate, etc. When given specific conditions (such as a failure in pump, such a case as the water level becomes higher than a pre-set water level, etc.) occur, the alarm notifying device 1*a* notifies their information to a remote support center, a person in charge of service, etc. by telephone, FAX, data communications, mail or the like.

Described more specifically, the alarm notifying device 1*a* according to the present embodiment is connected to the pump 41*a,* the distributing reservoir 42*a* and the well 43*a* through sequencers 31*a* through 33*a* and 51*a* through 53*a*. Further, the alarm notifying device 1*a* is connected to a monitor 21*a,* and a mail server 6 and a monitor 81*a* of the support center via a communication line 71 and a router 84. Similarly, alarm notifying devices 1*b* and 1*c* installed in drainage arrangements located in B and C cities are respectively connected to the mail server 6, a monitor 81*b* of the support center, a FAX apparatus 82, a telephone 83, etc. through a communication line 72. The alarm notifying devices 1*b* and 1*c* can be configured in a manner similar to the alarm notifying device la according to the present embodiment. Incidentally, a cellular phone 91, a FAX apparatus 92, a telephone 93, etc. that belong to persons in charge of service, are connected to the communication line 72 and are also capable of performing the transmission and reception of a mail, the reception of FAX, telephone calls, etc.

As shown in FIG. 2, the alarm notifying device 1*a* according to the present embodiment has a RS-232C monitoring program 101, a contact signal monitoring program 102, an analog signal monitoring program 103, a LAN monitoring program 104, a telephone signal analyzing converting program 105, a mail receiving program 111, a mail transmitting program 114 and a mail analyzing program 113. Mail receiving set data 112 is created by the RS-232C monitoring program 101, contact signal monitoring program 102, analog signal monitoring program 103, LAN monitoring program 104 and telephone signal analyzing converting program 105. The mail receiving program 111 executes a mail receiving process on the basis of the mail receiving set data 112. Further, the mail analyzing program 113 creates mail transmitting set data 115 on the basis of data received by the mail receiving program 111. The mail transmitting program 114 executes a mail transmitting process on the basis of the mail transmitting set data 115.

The alarm notifying device 1*a* according to the present embodiment has individual mail addresses. The main receiving program 111 lying in the alarm notifying device 1*a* is capable of receiving mails destined for the alarm notifying device 1*a,* which have been sent from the support center and each person in charge of service, from the mail server 6. In order to make a change in setting, a user ID and a password are written into a text of a received mail and checked upon its reception. One example of a mail to be transmitted is shown in FIGS. 3(*a*) and 3(*b*)

An advantage is brought about in that if the setting of the alarm notifying device 1*a* can be changed using a mail, then the settings of alarm notifying devices 1*a* located in plural places can be changed in one mail transmitting operation. As an example of the use of the alarm notifying device 1*a*, for instance, may be mentioned, alarm monitoring of each manhole pump for sewerage. Alarm notifying devices 1*a* corresponding to several to several tens of spots are installed in a city for the purpose of monitoring of manhole pumps. In the conventional alarm notifying devices, the lines have been directly connected one by one to change settings in the alarm notifying devices. On the other hand, in the alarm notifying devices 1*a* according to the present embodiment, the settings in all the alarm notifying devices 1*a* can be changed in one mail transmitting operation, and the number of man-hours for control can be reduced.

The mail analyzing program 113 in the alarm notifying device 1*a* analyzes an ID in a text of a received mail, a password, a command, a return mail address, an attached file, etc. When the read combination of ID and password has coincided with any of the combinations of IDs and passwords pre-set to the alarm notifying device 1*a*, the mail analyzing program 113 controls the alarm notifying device 1*a* according to the contents described in a text to thereby set data to the mail transmitting set data 115. The mail transmitting program 111 always monitors the mail transmitting set data 115 and mails information lying within the alarm notifying device 1*a* according to the contents thereof.

A destination, which is to transmit a mail, return a mail to a person who sends a mail destined for the alarm notifying device 1*a*. A mail return destination can also be transmitted even to each destination set within the alarm notifying device 1*a* in advance and a mail destination described in each received mail text. Further, the telephone signal analyzing converting program 105 is provided within the alarm notifying device 1*a* so that the destination of each pre-registered mail can be changed by telephone's buttons.

The time required for the alarm notifying device 1*a* to execute the reception of a mail from the mail server 6 is set to the mail receiving set data lying within the alarm notifying device 1*a* in advance. The set time can be changed by means of mails from the support center and each person in charge of service, telephone buttons, RS-232C circuit of each alarm notifying device, a LAN circuit, a contact circuit, and an analog circuit.

The contents of internal information of the alarm notifying device 1*a* can be displayed and confirmed by the monitor 81 or the like lying in the support center by way of the communication line 71. One example of the internal information of the alarm notifying device 1*a* is represented as shown in FIG. 4. In the drawing, operating information about each facility and a history of operations thereof other than the alarm of each facility can be attached to a mail returned by the alarm notifying device 1*a*.

Owing to the transmission of mails from the service center and each person in charge of service, the alarm notifying device 1*a* is capable of receiving information lying therein by mail.

Incidentally, while the above-described embodiment has described the alarm notifying device, a microcomputer or the like can be used as the alarm notifying device by use of a program for causing a computer to execute the function of receiving a mail, the function of analyzing the contents of a text of the received mail, and the function of changing information lying inside the alarm notifying device according to the contents of the text of the received mail, or a computer-readable recording medium (e.g., a CD-ROM or the like).

According to the present invention, an alarm notifying device having the function of receiving the operation of a warning message lying within each monitor by mail to thereby change it remotely can be obtained.

What is claimed is:

1. An alarm notifying device comprising:

a circuit which performs communications through a communication line;

a circuit which detects a signal indicative of an operating condition of a facility to be monitored, and an alarm signal sent therefrom;

a CPU;

said alarm notifying device notifying an alarm to the outside when the alarm signal is detected;

the function of receiving a mail;

the function of analyzing the contents of a text of the received mail; and the function of changing information lying inside the alarm notifying device according to the contents of the text of the received mail.

2. The alarm notifying device according to claim 1, further including the function of reading an ID and a password from the received mail and determining whether the read ID and password coincide with one of combinations of IDs and passwords pre-set to the alarm notifying device by comparison.

3. The alarm notifying device according to claim 1, further including the function of transmitting the information lying inside the alarm notifying device through the communication line.

4. The alarm notifying device according to claim 1, further including the function of transmitting a reply to the received mail to a mail's sender.

5. The alarm notifying device according to claim 1, further including the function of receiving a mail from a telephone line.

6. The alarm notifying device according to claim 1, further including the function of confirming whether a mail is regularly received.

7. The alarm notifying device according to claim 1, further including the function of receiving a mail from a circuit for receiving a signal by way of a LAN.

8. The alarm notifying device according to claim 1, further including the function of receiving a mail from a circuit for receiving a signal by way of RS-232C.

9. The alarm notifying device according to claim 1, further including the function of receiving a mail from a contact signal circuit.

10. The alarm notifying device according to claim 1, further including the function of receiving a mail from an analog signal circuit.

11. The alarm notifying device according to claim 1, further including the function of by-mail transmitting a reply to the received mail to a pre-registered transmitted destination.

12. The alarm notifying device according to claim 1, further including the function of changing a mail destination by buttons of a telephone.

13. A computer readable medium having a computer program used in an alarm notifying device having a circuit which performs communications through a communication line, a circuit which detects a signal indicative of an operating condition of a facility to be monitored, and an alarm signal sent therefrom, and a CPU, said alarm notifying device notifying an alarm to the outside when the alarm signal is detected, said computer program causing the alarm notifying device to operate the function of receiving a mail, the function of analyzing the contents of a text of the received mail, and the function of changing information lying inside the alarm notifying device according to the contents of the text of the received mail transmitting the information through the communication line.

* * * * *